(12) United States Patent
Alm et al.

(10) Patent No.: US 10,173,669 B2
(45) Date of Patent: Jan. 8, 2019

(54) METHOD AND ARRANGEMENT FOR IMPROVING MANOEUVRABILITY OF A VEHICLE COMBINATION

(71) Applicant: VOLVO TRUCK CORPORATION, Göteborg (SE)

(72) Inventors: Filip Alm, Bohus (SE); Andreas Jansson, Göteborg (SE); Leo Laine, Härryda (SE)

(73) Assignee: Volvo Truck Corporation, Göteborg (SE)

( * ) Notice: Subject to any disclaimer, the term of this patent is extended or adjusted under 35 U.S.C. 154(b) by 30 days.

(21) Appl. No.: 15/526,418

(22) PCT Filed: Dec. 19, 2014

(86) PCT No.: PCT/SE2014/000156
§ 371 (c)(1),
(2) Date: May 12, 2017

(87) PCT Pub. No.: WO2016/099344
PCT Pub. Date: Jun. 23, 2016

(65) Prior Publication Data
US 2017/0320488 A1   Nov. 9, 2017

(51) Int. Cl.
*B60W 30/045* (2012.01)
*B60K 6/52* (2007.10)
(Continued)

(52) U.S. Cl.
CPC ............. *B60W 30/045* (2013.01); *B60K 1/00* (2013.01); *B60K 6/48* (2013.01); *B60K 6/52* (2013.01);
(Continued)

(58) Field of Classification Search
CPC .......................... B60W 30/045; B60W 20/15
See application file for complete search history.

(56) References Cited

U.S. PATENT DOCUMENTS

| | | |
|---|---|---|
| 4,688,818 A | 8/1987 | Grassmuck |
| 6,419,037 B1 | 7/2002 | Kramer et al. |
| 2001/0003393 A1 | 6/2001 | Cooper |

FOREIGN PATENT DOCUMENTS

| | | |
|---|---|---|
| DE | 3224590 A1 | 3/1983 |
| EP | 1847443 A2 | 10/2007 |
| WO | 2103066215 A1 | 5/2013 |

OTHER PUBLICATIONS

International Search Report (dated Sep. 21, 2015) for corresponding International App. PCT/SE2014/000156.
(Continued)

*Primary Examiner* — Michael D Lang
(74) *Attorney, Agent, or Firm* — WRB-IP LLP

(57) ABSTRACT

An arrangement for improving maneuverability of a vehicle combination that includes a first vehicle unit, a second vehicle unit and a third vehicle unit interconnected by articulated joints, where the vehicle combination includes two driven axles and where each driven axle can be controlled independently, an arrangement for determining the articulation angel between the vehicle units, an arrangement for determining a steering wheel angle of the vehicle combination, an arrangement for determining the speed of the vehicle combination, an arrangement for determining the yaw rate of the vehicle units, and an arrangement for determining a delay value between the steering wheels of the vehicle combination and at least one articulated joint, where the arrangement is adapted to control a desired articulation angle of the articulated joints by coordinating the force ratio between the two driven axles by using the determined yaw rate of the vehicle units and the determined delay value.

21 Claims, 3 Drawing Sheets

(51) Int. Cl.
  *B62D 13/00*     (2006.01)
  *B60W 30/02*     (2012.01)
  *B62D 53/00*     (2006.01)
  *B60K 1/00*      (2006.01)
  *B60K 6/48*      (2007.10)
  *B60W 20/15*     (2016.01)
  *B60K 6/40*      (2007.10)

(52) U.S. Cl.
  CPC ............ *B60W 20/15* (2016.01); *B60W 30/02* (2013.01); *B62D 13/00* (2013.01); *B62D 53/005* (2013.01); *B60K 6/40* (2013.01); *B60K 2001/001* (2013.01); *B60W 2520/14* (2013.01); *B60W 2540/18* (2013.01); *B60W 2720/22* (2013.01); *B60W 2720/403* (2013.01); *B60Y 2200/148* (2013.01); *B60Y 2200/92* (2013.01); *B60Y 2300/045* (2013.01); *Y02T 10/6221* (2013.01); *Y02T 10/6265* (2013.01); *Y10S 903/93* (2013.01); *Y10S 903/951* (2013.01)

(56) References Cited

OTHER PUBLICATIONS

European Official Action (dated Jul. 30, 2018) for corresponding European App. EP 14 90 8523.

METHOD AND ARRANGEMENT FOR IMPROVING MANOEUVRABILITY OF A VEHICLE COMBINATION

BACKGROUND AND SUMMARY

The present invention relates to an arrangement and a method for improving manoeuvrability of a vehicle combination comprising at least three vehicle units interconnected by articulated joints. The arrangement and method is especially suited for heavy vehicle combinations comprising three or more vehicle units, where two vehicle units are provide with driven axles.

It is becoming more and more common to provide heavy vehicles with more than one driven axle. This is especially true for hybrid vehicles, where one axle is driven by a combustion engine in a regular fashion, and where a further driven axle is provided with an electrical machine. The electric machine can function as an electric motor for providing propulsive force to the vehicle when required, and can function as a alternator for retrieving energy when the vehicle brakes.

It is common to use only the electric motor to propel the vehicle in environmental sensitive areas, in city centres or when starting to drive. One situation in which the electric machine is used as an electric motor together with the combustion engine is when extra propulsive energy is needed, e.g. when the vehicle is accelerating. When the vehicle is propelled by both the combustion engine and the electric motor, it is important that the two wheel axles are synchronized in order to improve driveability and to reduce energy losses.

One area in which hybrid vehicles are used more and more is in city buses. The main purpose is to reduce emissions and to reduce energy cost. Even though most buses are rigid buses, it is also common to provide both articulated buses and bi-articulated buses, especially where a high capacity is required. A conventional articulated bus can be either of a pusher or a puller configuration. In a conventional pusher bus, only the rear C-axle is powered by a rear-mounted internal combustion engine, and the longitudinal stability of the vehicle is maintained by active hydraulics mounted under the articulated joint. In a conventional puller articulated buses, the engine is mounted either under the floor or off-center, at the side of the bus, and only the B-axle is powered.

When introducing a further driven wheel axle on a hybrid articulated bus, which comprises an electric machine, the further driven axle will be positioned in the vehicle unit that does not comprise the combustion engine. One obvious reason is that the only not powered axle, apart from the steering axle, will be positioned in the other vehicle unit. Another reason would be to improve the traction of the vehicle.

Thus, a pusher type hybrid articulated bus would comprise a rear axle, the C-axle, powered by a combustion engine and a rear axle of the front vehicle unit, the B-axle, powered by the electric machine. A puller type hybrid articulated bus would comprise a rear axle of the front vehicle unit, the B-axle, powered by a combustion engine and a rear axle, the C-axle, powered by an electric machine.

Normally, both axles will not be powered simultaneously. When the battery is low, when driving relatively fast or when driving outside of a city centre, the combustion engine will be used alone. When driving in environmental sensitive areas, in city centres or when the batteries are charged, only the electric motor is used to propel the vehicle. Only when a higher power is required, e.g. when a hill is to be climbed or when starting to drive, both the combustion engine and the electric motor can be used to propel the vehicle. When the vehicle is propelled by both the combustion engine and the electric motor, it is important that the two wheel axles are synchronized such that the longitudinal forces in the articulated joint are minimized.

Hybrid trucks are also becoming more common. In a smaller delivery truck having only one rear axle powered by a combustion engine, the electric machine will be connected to the same rear axle. These are referred to as parallel hybrid vehicles, since the two engines can work in parallel. It is also common to use serial hybrid vehicles, where the axle is only driven by the electric machine and where the combustion engine only drives an alternator.

For larger hybrid trucks and tractors, it is impractical to have a main rear axle which is powered by a combustion engine and an additional rear axle that is powered by an electric machine, since the additional axle is only used when necessary, i.e. when a heavy load is to be carried. Instead, it is suggested to provide the trailer with an electric machine to power an additional driven axle. This is especially advantageous for a tractor-trailer combination, since there is not enough room for extra batteries on a tractor and since a weight increase of a tractor could overload the front axle. By placing the complete hybrid system in the trailer would allow for a flexible solution without impairing the tractor properties. Also in such an arrangement, it is important that the two wheel axles are synchronized such that the longitudinal forces in the articulated joint are minimized.

It is also possible to place a hybrid system in a drawbar trailer which is to be connected to a truck, or in a trailer of a dolly-trailer combination which is also to be connected to a truck. By using both a combustion engine and an electric machine to propel the vehicle combination when extra power is required, an increased traction is obtained.

For all articulated vehicle combinations having a driven axle in more than one vehicle unit, it is important to synchronize the propulsive force to each wheel axle such that the different vehicle units propel the vehicle by an equal amount. If the drive axles are not synchronized properly, the vehicle combination may become unstable or energy may be lost. Such vehicles are thus provided with a control system that will synchronize the wheel axles.

An advantage of a long vehicle combination comprising several vehicle units is that it is in general more transport efficient since their load capacity is higher. An articulated bus may e.g. transport more passengers than a rigid bus.

One problem with a longer vehicle combination may be the stability of the vehicle combination. Even for vehicle combinations comprising two vehicle units, such as a tractor trailer combination, stability problems may arise when braking or turning. One stability problem that may arise is that the trailer starts swinging from side to side. This may happen when the vehicle combination travels with a relatively high speed and changes lane or drives in curves. The stability of the vehicle combination will normally correct itself when the vehicle travels straight, but this may still affect the traffic around the vehicle, either by bumping in to other vehicles or by scaring drivers in the vicinity. Another type of stability problem arises when the vehicle combination brakes. One such problem is known as jack-knifing, in which the trailer will spin around such that the tractor and trailer will resemble a folded pocket knife. This may happen when the trailer is braked less than the tractor. Another problem is known as swing out, where too much braking force by the trailer and low tyre/road friction may cause loss of lateral gripping force. This may cause the trailer to start swinging back and forth or to rotate.

There are several ways of improving the stability of a vehicle combination in order to avoid accidents. Solutions reducing the turning angle for the trailer have been proposed, unsuccessfully. Anti-lock brakes and electronic brake force distribution controlled by an electronic control unit has reduced some types of accidents. Such solutions are mostly designed for a vehicle combination having a single trailer, and use the brakes to stabilize the vehicle combination. For a vehicle combination provided with two driven axles and comprising more than two vehicle units, the proposed solutions will not suffice. There is thus still room for improvements.

It is desirable to provide an arrangement for improving manoeuvrability of a vehicle combination comprising three vehicle units interconnected by articulated joints, where two vehicle units are provided with a driven axle. It is also desirable to provide a method for improving the manoeuvrability of a vehicle combination comprising three vehicle units, where two vehicle units are provided with a driven axle.

In an arrangement according to an aspect of the present invention for improving manoeuvrability of a vehicle combination comprising a first vehicle unit, a second vehicle unit and a third vehicle unit interconnected by articulated joints, where the vehicle combination further comprises a distributed propulsion system, in which the vehicle combination comprises a first driven axle and a second driven axle and in which the first and the second driven axles can be controlled independently, means for determining the articulation angle between the vehicle units, means for determining a steering wheel angle of the vehicle combination, means for determining the speed of the vehicle combination, means for determining the yaw rate of the vehicle units and means for determining a delay value between the steering wheels of the vehicle combination and at least one articulated joint, the problem is solved in that the arrangement is adapted to control a desired articulation angle between of the first and the second articulated joints by coordinating the force ratio between the first driven axle and the second driven axle by using the determined yaw rate or articulation angle of the vehicle units and the determined delay value.

By this first embodiment of the arrangement, the arrangement will control a desired articulation angle of the articulated joints by coordinating the force ratio between the first driven axle and the second driven axle. In this way, the rotational torque acting on the articulated joints can be increased or decreased, which in turn will affect the actual articulation angles.

In one example, the articulation angle of the first and the second articulated joints is the same. This may be the case when the different vehicle units have substantially the same length. With the same articulation angles, the control of the vehicle combination is simplified and the manoeuvrability of the vehicle combination is increased. When the vehicle combination turns, the behaviour of the two articulated joints will be similar and symmetrical. There is thus no need to introduce synchronization means between the two articulated joints. A certain damping in each articulated joint may be of advantage.

In another example, the articulation angle of the first and the second articulated joints will differ. This will be the case when the vehicle units have different lengths or when the articulated joints differ from each other. With different articulation angles, a mean value for the first and the second articulation angle can be used as a single articulation angle.

In one example of the invention, the first driven axle is provided in the first vehicle unit and the second driven axle is provided in the third vehicle unit. An example of such a vehicle combination is a bi-articulated bus having a combustion engine mounted in the rear part of the bus, and an electric motor mounted in the front part of the bus. By adding an electric driveline to the front part of the bus, a low floor of the bus can be preserved since both an electric motor and batteries can be fitted below the front low floor of a standard bus. In some bi-articulated buses, the combustion engine is mounted in the front part of the bus. In such a bus, it is possible to mount an electric driveline in the rear part of the bus, and still preserve the low floor of the rear part.

The vehicle combination may also be e.g. a truck with a dolly and a trailer. In such a vehicle, the combustion engine is mounted in the truck and the trailer will be provided with an electric driveline, where an electric motor and batteries are mounted in the trailer. The vehicle combination may also be a truck with a drawbar trailer, where the trailer is provided with a hybrid electric driveline.

By increasing the propulsive force of the rearmost driven axle in relation to the front driven axle, the rear vehicle unit will push against the articulated joints which in turn will produce a positive rotational torque on the articulated joints. The articulation angle will in this case increase and the radius of the travelled path will decrease. This function can be used when the articulated vehicle combination is travelling through a sharp bend, in order to decrease the turning radius of the vehicle combination and to allow the vehicle combination to follow the intended path.

By decreasing the propulsive force of the rearmost driven axle in relation to the front driven axle, the rear vehicle unit will apply a pulling force on the articulated joints which in turn will produce a negative rotational torque on the articulated joints. The articulation angle will in this case decrease and the radius of the travelled path will increase. This function can be used when the articulated vehicle combination is to be straightened out, in order to stabilize the vehicle combination.

By varying the force ratio between the first driven axle and the second driven axle, it is possible to create either a pushing or compressive force or a pulling or stretching force on the articulated joints. In this way, the actual articulation angle of the articulated joints can be controlled to follow a desired articulation angle. The desired articulation angle may e.g. represent a desired path that the vehicle combination is following, and may be based on the steering wheel angle of the leading vehicle unit and the determined delay value. A desired path may also be determined from a vehicle model having the articulation angle, the steering wheel angle and the vehicle speed as input. The determined delay value is a delay time based on the speed of the vehicle combination and corresponds to the distance between the front axle and respective articulated joint. If the vehicle travels with a relatively low speed or stands still, it is preferred to let the delay value be a distance instead. In this way, the control system can start to control the desired articulation angles when the vehicle combination starts to travel, based on the measured articulation angles and the distance.

In another example of the invention, the first driven axle is provided in the second vehicle unit and the second driven axle is provided in the third vehicle unit. An example of such a vehicle combination is a bi-articulated bus having a combustion engine mounted in the rear part of the bus, and an electric motor mounted in the middle part of the bus. By adding an electric driveline to the middle part of the bus, a low floor of the bus can be preserved since both an electric motor and batteries can be fitted below the middle low floor of a standard bus.

The inventive arrangement can be used to improve the manoeuvrability of the vehicle combination and to stabilize the vehicle. One condition in which it is advantageous to improve the manoeuvrability of the vehicle combination is when the vehicle combination is to travel through a sharp turn. Such a manoeuvre is mostly done when the vehicle combination travels at a low speed. It is thus of importance to only allow such a manoeuvre when the actual vehicle speed is below a predetermined vehicle speed. Such a predetermined speed may be below 15-30 km/h.

One condition in which it is advantageous to improve the stability of the vehicle combination is when the vehicle combination travels straight or along a slightly curved path at a relatively high speed. In such a condition, it may be of advantage to create a slight stretching force on the articulated joint which will counteract any longitudinal instability, caused e.g. by a side wind or uneven road surface. It may also be of advantage to apply a slight stretching force on the articulated joint when the vehicle is travelling on a slippery road, in order to prevent jack-knifing.

The inventive arrangement is suitable for different vehicle combinations. Such vehicle combinations include vehicle combinations having two or more articulated joints, such as a tractor, a dolly and a semi-trailer or a bi-articulated bus.

In a method for method for improving the manoeuvrability of a vehicle combination comprising a first vehicle unit, a second vehicle unit and a third vehicle unit, where the vehicle combination comprises a first driven axle and a second driven axle, where the vehicle units are interconnected by articulated joints, the steps of determining the articulation angles of the articulated joints, determining a steering wheel angle of the vehicle combination, determining the speed of the vehicle combination, determining the yaw rate of the vehicle units, determining a delay value between the steering wheels of the vehicle combination and at least one the articulated joint, and controlling a desired articulation angle between the vehicle units by coordinating the force ratio between the first driven axle and the second driven axle by using the determined yaw rate of the vehicle units and the determined delay value are comprised.

With the inventive method, the manoeuvrability of a vehicle combination comprising at least three vehicle units interconnected by articulated joints can be improved.

BRIEF DESCRIPTION OF DRAWINGS

The invention will be described in greater detail in the following, with reference to the attached drawings, in which.

DETAILED DESCRIPTION

The embodiments of the invention with further developments described in the following are to be regarded only as examples and are in no way to limit the scope of the protection provided by the patent claims. The arrangement is suitable for all kinds of vehicle combinations comprising three vehicle units and where two vehicle units each comprise a driven axle, and is especially suitable for heavy vehicles such as trucks towing one or more trailers or buses comprising two articulated joints.

Figure 1:
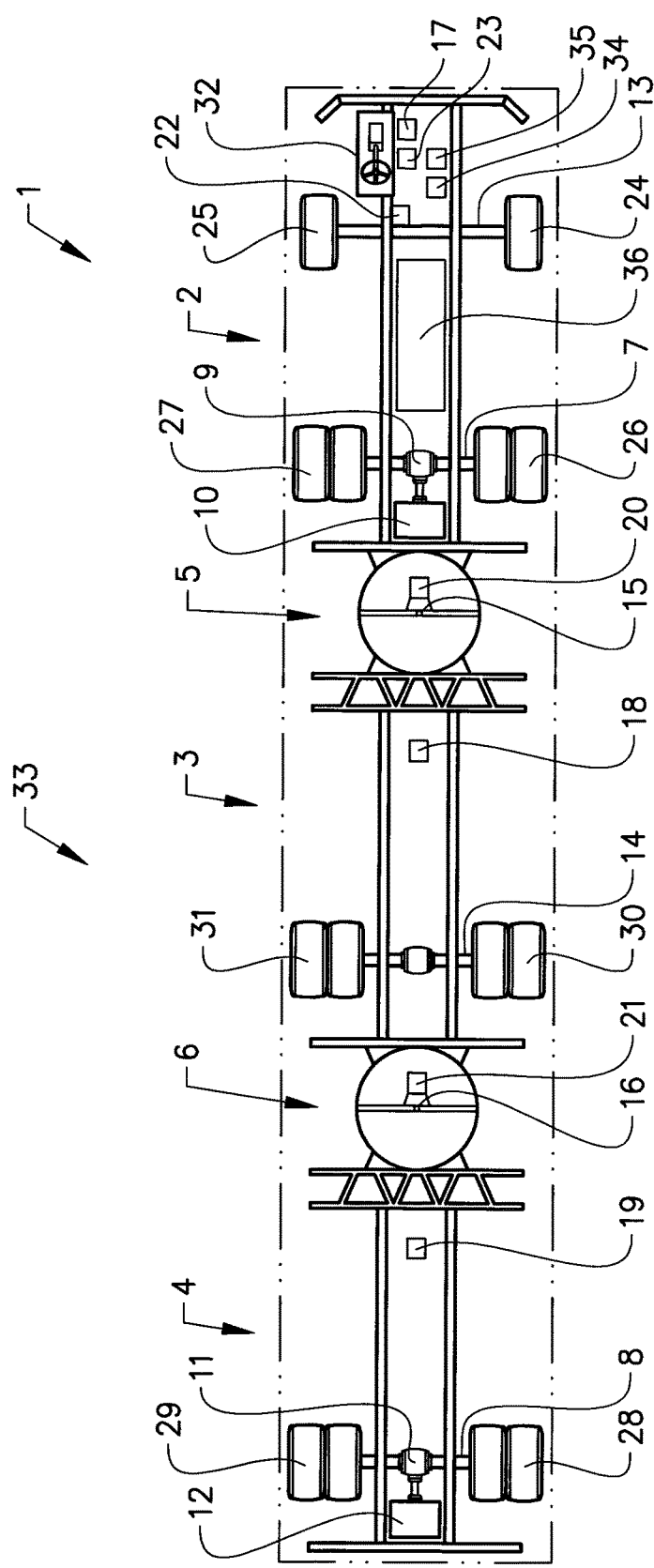
FIG. 1 shows a schematic vehicle combination comprising three vehicle units according to the invention.

FIG. 1 shows a schematic vehicle combination 1 comprising a first vehicle unit 2, a second vehicle unit 3 and a third vehicle unit 4. The first vehicle unit 2 and the second vehicle unit 3 are interconnected by a first articulated joint 5. The second vehicle unit 3 and the third vehicle unit 4 are interconnected by a second articulated joint 6. In the shown example, a bi-articulated bus is used as an example of a vehicle combination. Another example may e.g. be a tractor towing a dolly-semitrailer combination or a truck towing a drawbar trailer. The first vehicle unit 2 is the front section of a bi-articulated bus, the second vehicle unit 3 is the middle section and the third vehicle unit 4 is the rear section of the bi-articulated bus. Such buses are normally used for public transportation, preferably in crowded areas where a high transport capacity is needed. The vehicle combination is provided with a distributed propulsion system 33 which in the shown example is a parallel hybrid system comprising a second propulsive source and a first propulsive source. In the shown example, the second propulsive source is a combustion engine 12 and the first propulsive source is an electric machine 10, which can be used as an electric motor. The second propulsive source may also be a combustion engine combined with an electric machine mounted in parallel. A means 35 for determining the speed of the vehicle combination is further provided in the first vehicle unit. This can e.g. be a speedometer registering the rotational speed of a wheel and may be combined with a GPS-based speedometer system.

The first vehicle unit 2 is in this example provided with the electric machine 10. The electric machine is connected to the first driven axle 7 through a first differential 9 and is powered by a battery 36. The wheels 26, 27 of the first driven axle will thus provide the same propulsive force when in use, even when the vehicle is turning such that the wheels will rotate with different rotational speeds. The first vehicle unit 2 is further provided with a front axle 13 having two front wheels 24, 25 which are controlled by a steering wheel 32. An angle sensor 22 measures the steering angle of the front wheels. The first vehicle unit 2 is also provided with yaw rate determination means 17, which may be a yaw rate sensor that measures the actual yaw rate of the first vehicle unit. The first vehicle unit is also provided with a first articulation angle determining means 20 which may be an angle sensor adapted to measure the first articulation angle.

The first vehicle unit 2 is also provided with delay time determination means 23, which determines a delay value between the steering wheels of the vehicle combination and at least one of the articulated joints 5, 6. It is possible to determine a first delay value for the distance between the centre of the steering wheels of the front axle and the first pivoting point 15 of the first articulated joint 5. This delay value corresponds to the distance travelled by the first pivoting joint during the delay time, i.e. the distance from the front axle to the first pivoting joint when the vehicle combination travels with a steady speed. The first delay value may also be the distance between the front axle and the first pivoting point. It may be of advantage to use a distance value when the vehicle travels with a low speed or stands still. In the same way, it is possible to determine a second delay value for the distance between the centre of the steering wheels of the front axle and the second pivoting point 16 of the second articulated joint 6. The first vehicle unit is further provided with a control unit 34 which is adapted to perform estimations and calculations regarding the parameters used. The control unit may be a stand-alone control unit or it may be integrated in an existing control unit, such as in the electronic control unit of the vehicle combination.

In the shown example, the length of the first, the second and the third vehicle units is substantially the same. The articulation angle of the first and the second articulated joints will in this case be substantially the same. For this case, a delay value for the distance between the centre of the steering wheels of the front axle and the centre between the first articulated joint 5 and the second articulated joint 6 can be determined and used instead of the first and the second delay values. The centre between the first articulated joint 5 and the second articulated joint 6 will in this case be treated as an imaginary articulated joint. This delay value corresponds to the distance travelled by the centre of the second vehicle unit during the delay time, and can be used to control the articulation angles when the first and the second articulation angles are equal.

In another example, the articulation angle of the first and the second articulated joints will differ. This will be the case when the vehicle units have different lengths or when the articulated joints differ from each other. With different articulation angles, a mean value for the first and the second articulation angle can be used as a single articulation angle. It would also be possible to use the sum of the first and the second articulation angles as a single articulation angle. Further, a new delay value can be determined, which is a mean value of the first and the second delay values. The delay value may also be a mean value of the first and the second distance between the front axle and the respective articulation joint.

The second vehicle unit 3 is the middle section of the bi-articulated bus. The second vehicle unit is provided with a non-driven axle 14 having two wheels 30, 31. The second vehicle unit is further provided with a second yaw rate determining means 18 and a second articulation angle determining means 21 which may be an angle sensor adapted to measure the second articulation angle.

The third vehicle unit 4 is provided with the combustion engine 12. The combustion engine may be used alone to propel the vehicle combination, it may be shut off such that the vehicle combination is propelled only by electricity or the combustion engine may be used together with the electric motor when a higher force is required or when the manoeuvrability of the vehicle combination is to be enhanced. The combustion engine is connected to the second driven axle 8 through a second differential 11. The wheels 28, 29 of the second driven axle will thus provide the same propulsive force when in use. The second vehicle unit 4 is also provided with a third yaw rate determination means 19, which may be a yaw rate sensor that measures the actual yaw rate of the third vehicle unit.

The first vehicle unit 2 and the second vehicle unit 3 are interconnected with a first articulated joint 5. In the shown example, the first articulated joint is a fixed articulation joint comprising a turntable, which is commonly used in articulated buses. The first articulated joint 5 may also be any coupling used by trucks, such as a fifth wheel or a drawbar coupling, when the vehicle combination is a tractor with a trailer. The first articulated joint 5 comprises a first pivoting point 15 around which the first articulated joint rotates. The pivoting point is an imaginary point which represents the geometrical rotational centre of the articulated joint.

The second vehicle unit 3 and the third vehicle unit 4 are interconnected with a second articulated joint 6. In the shown example, the second articulated joint is a fixed articulation joint similar to the first articulated joint. The second articulated joint 6 comprises a second pivoting point 16 around which the second articulated joint rotates. The pivoting point is an imaginary point which represents the geometrical rotational centre of the articulated joint.

Since a driven axle is provided with a differential gear, each wheel will deliver the same propulsive force also when the vehicle combination is turning, by allowing the two wheels to rotate with different rotational speeds. The force applied on the articulated joints will thus be symmetric and will not apply an additional yaw rate or rotational torque on the articulated joints.

In the described example, the first and the second articulated joints are similar. Mostly, similar articulated joints are used in a bi-articulated bus, but it is possible to use different turntables for the first and the second articulated joint. When the vehicle combination is a tractor or a truck with one or more trailers, the articulated joints will differ from each other. Each articulated joint may also be provided with an articulation angle determining means in order to determine the articulation angel between two adjacent vehicle units. There are different ways of obtaining the articulation angle. One possibility is to use an angle sensor mounted e.g. at the pivoting point. Such a sensor is possible to use for a fixed articulated joint. For detachable joints, such as a drawbar coupling or a fifth wheel, other determining means may be more robust, such as cameras or other optical sensors.

In the described example, the first articulation angle and the second articulation angle will be the same, since the articulated joints are similar. The articulated joints will thus behave in a symmetric manner, which means that the articulation angles will equal each other.

During normal operation of the vehicle combination, one of the driven axles is often used to propel the vehicle combination. Depending on e.g. where the vehicle is driven and on the electric energy storage capacity, the combustion engine or the electric machine is used. The electric machine is preferably used in city centres or other densely populated areas, or when the batteries are charged with electricity. The combustion engine is preferably used when driving outside of these areas or when the batteries are more or less empty.

In some cases, it is also of advantage to use both the combustion engine and the electric machine to propel the vehicle combination. One reason is when extra power is required, such as when starting, accelerating or driving up a hill. Another reason may be to increase traction when the road condition is slippery. In those cases, both driven axels will deliver the same propulsive force.

Another reason for using both the combustion engine and the electric machine to propel the vehicle is to improve the manoeuvrability of the vehicle combination. In this case, the force ratio between the first driven axle and the second driven axle will be controlled such that a desired first and second articulation angle will be obtained. In this way, the rotational torque acting on the articulated joints can be increased or decreased, which in turn will affect the actual articulation angles.

By increasing the propulsive force of the driven axle of the third vehicle unit in relation to the driven axle of the first vehicle unit, the third vehicle unit will push against the second articulated joint which in turn will produce a positive rotational torque on the second articulated joint. Further, this pushing action will cause the second vehicle unit to push against the first articulated joint which in turn will produce a positive rotational torque on the first articulated joint. The first and second articulation angles will in this case increase and the radius of the travelled path will decrease. In this way, it is possible to increase the articulation angle of the vehicle combination which in turn can be used when the articulated vehicle combination is travelling through a sharp bend. This will also allow the vehicle combination to follow the intended path initiated by the steered front wheels. Without actively controlling the articulation angles, it may be that the radius travelled by the articulated joint is larger than the radius travelled by the steered front wheels, such that the articulated joint cuts corners. By controlling the desired articulation angles, this may be avoided.

In order to control the articulation angle when the vehicle drives e.g. around a tight corner, the system detects the steering angle of the vehicle combination. When the steering angle exceeds a predetermined angle value, e.g. 10 degrees or more, the system will increase the propelling force of the combustion engine, in order to increase the articulation angles of the first and the second articulated joints. The force ratio between the first driven axle and the second driven axle will depend on the radius of the travelled path and on the speed of the vehicle combination. When the curved path is finished and the vehicle combination straightens out, the force ratio can be set to one again.

It is also possible to use the distance between the front axle and the respective articulated joints as an input value together with the articulation angles. This can be of advantage when the vehicle combination e.g. is following a curved path and has to stop during the travel. In order to be able to follow the same path with the different vehicle units, i.e. to be able to determine a desired articulation angle, it is important to have a reliable starting value. When the vehicle combination stands still, the yaw rates of the vehicle units will all be zero, and it will thus be impossible to determine a desired articulation angle before the vehicle has travelled a specific distance. By using the articulation angles as input values, the vehicle combination can continue to follow the same travelled path when the vehicle combination continues to travel, without any disruptions. This will allow for a smooth ride along the curved path, even if the vehicle combination has to stop or drive very slow. The desired articulation angle is preferably determined by using a linear vehicle model.

If the vehicle combination is propelled only by the electric machine when the vehicle combination enters the curved path, the combustion engine is started such that a desired force ratio can be set. The same applies if the vehicle combination is only propelled by the combustion engine when the vehicle combination enters the curved path. In this case, the electric machine is activated as an electric motor.

By decreasing the propulsive force of the driven axle of the third vehicle unit in relation to the driven axle of the first vehicle unit, the third vehicle unit will apply a pulling force on the second articulated joint which in turn will produce a negative rotational torque on the second articulated joint. Further, this pulling action will cause the second vehicle unit to pull at the first articulated joint which in turn will produce a negative rotational torque on the first articulated joint. The articulation angle will in this case decrease and the radius of the travelled path will increase. This function can be used when the articulated vehicle combination is to be straightened out, in order to stabilize the vehicle combination.

By varying the force ratio between the second driven axle and the first driven axle, it is possible to create either a compressive force or a stretching force on the articulated joints. In this way, the actual articulation angle of the articulated joints can be controlled to a desired articulation angle. The desired articulation angles may e.g. represent a desired path that the vehicle combination is following, which is set by the steering wheel angle of the first vehicle unit and at least one determined delay value. A desired path may also be determined from a vehicle model having the articulation angles, the steering wheel angle and the vehicle speed as input.

For the vehicle combination described in this example, where a driven axle is connected to a propulsive source through a differential gear, both wheels of a driven axle will deliver the same propulsive force. The force applied on an articulated joint will thus be symmetrical and will not apply an additional yaw rate or rotational torque on that articulated joint.

The inventive arrangement can be used to improve the manoeuvrability of the vehicle combination and to stabilize the vehicle. One condition in which it is advantageous to improve the manoeuvrability of the vehicle combination is when the vehicle combination is to travel through a sharp turn. Such a manoeuvre is mostly performed when the vehicle combination travels at a low speed. It may thus be of importance to only allow such a manoeuvre when the actual vehicle speed is below a predetermined vehicle speed. Such a predetermined speed may be below 15-30 km/h.

One condition in which it is advantageous to improve the stability of the vehicle combination is when the vehicle combination travels straight at a relatively high speed. In such a condition, it may be of advantage to create a slight stretching force on the articulated joints which will counteract any longitudinal instability, caused e.g. by a side wind or uneven road surface. The stabilization of the vehicle in order to counteract longitudinal instability is preferably performed when the vehicle combination travels at a relatively high speed. In one development, such stabilization is only allowed when the actual vehicle speed is above a predetermined vehicle speed, e.g. above 50 km/h.

It may also be of advantage to apply a slight stretching force on the articulated joint when the vehicle is travelling on a slippery road, in order to prevent jack-knifing. In such a case, stabilization by applying a stretching force on the articulated joints is also allowed at slow speeds.

When the vehicle combination is travelling along a curved path, the desired path is set by the angle of the front wheels. By determining the articulation angles of each articulated joint, it is possible to use a vehicle model to estimate if each vehicle unit, or more specifically, if each wheel axel of each vehicle unit follows the desired path. If not, it is possible to determine the deviation from the desired path. By controlling the propulsive ratio between the two driven axles, it is possible to control the desired articulation angle such that each wheel axle follows the desired path. With the speed of the vehicle and the determined delay time, it is possible to control the articulation angles such that each pivot point follows the desired path.

In order to control the articulation angle when the vehicle drives straight and is to be stabilized, the system detects the speed and the yaw rate of the vehicle combination. If the speed exceeds a predetermined speed value, e.g. 60 km/h or more, and the yaw rate exceeds a predetermined value, the system will decrease the propelling force of the combustion engine, in order to decrease the articulation angles of the first and the second articulated joints. The force ratio between the first driven axle and the second driven axle will depend on the measured yaw rate and on the speed of the vehicle combination. When the vehicle combination is stabilized, i.e. when the measured yaw rate is below a predetermined value, the force ratio can be set to one again. Here, the articulation angle is controlled to be as small as possible, or to be smaller than a predefined angle value.

If the vehicle combination is propelled only by the electric machine when it is decided to stabilize the vehicle combination, the combustion engine is started such that a desired force ratio can be set. The same applies if the vehicle combination is only propelled by the combustion engine when it is decided to stabilize the vehicle combination. In this case, the electric machine is activated as an electric motor.

If the conditions are slippery and the vehicle combination is traveling straight, i.e. with no substantial steering angle, the vehicle combination can also be stabilized. In this case, the stabilization will take place regardless of the speed of the vehicle combination. Instead, the yaw rate will be used to determine if the vehicle combination is to be stabilized. When the yaw rate exceeds a predetermined value, or when the articulation angle increases by a certain amount, and e.g. the ABS-system indicates slippery conditions, the force ratio between the first driven axle and the second driven axle is controlled such that the vehicle combination is stabilized. The articulation angle is here controlled to be smaller than a predefined angle value or to be close to zero.

If the vehicle combination travels along a curved path, the articulation angle is controlled to correspond to the curved path indicated by the steering angle. If the articulation angle exceeds this value, such that the articulation angle corresponds to a path that is curved more than the steering wheels indicates, the vehicle combination is stabilized such that the articulation angle corresponds to the curved path indicated by the steering angle.

It is of advantage to use the articulation angle as input for determining a desired articulation angle when the vehicle is travelling at low speed, since the yaw rate may be relatively low at low speeds and since the resolution of a yaw rate sensor may not be high enough for measuring small yaw rate values with a high precision. A low signal will also contain more noise and other disturbances which will degrade the measured signal.

Figure 2:
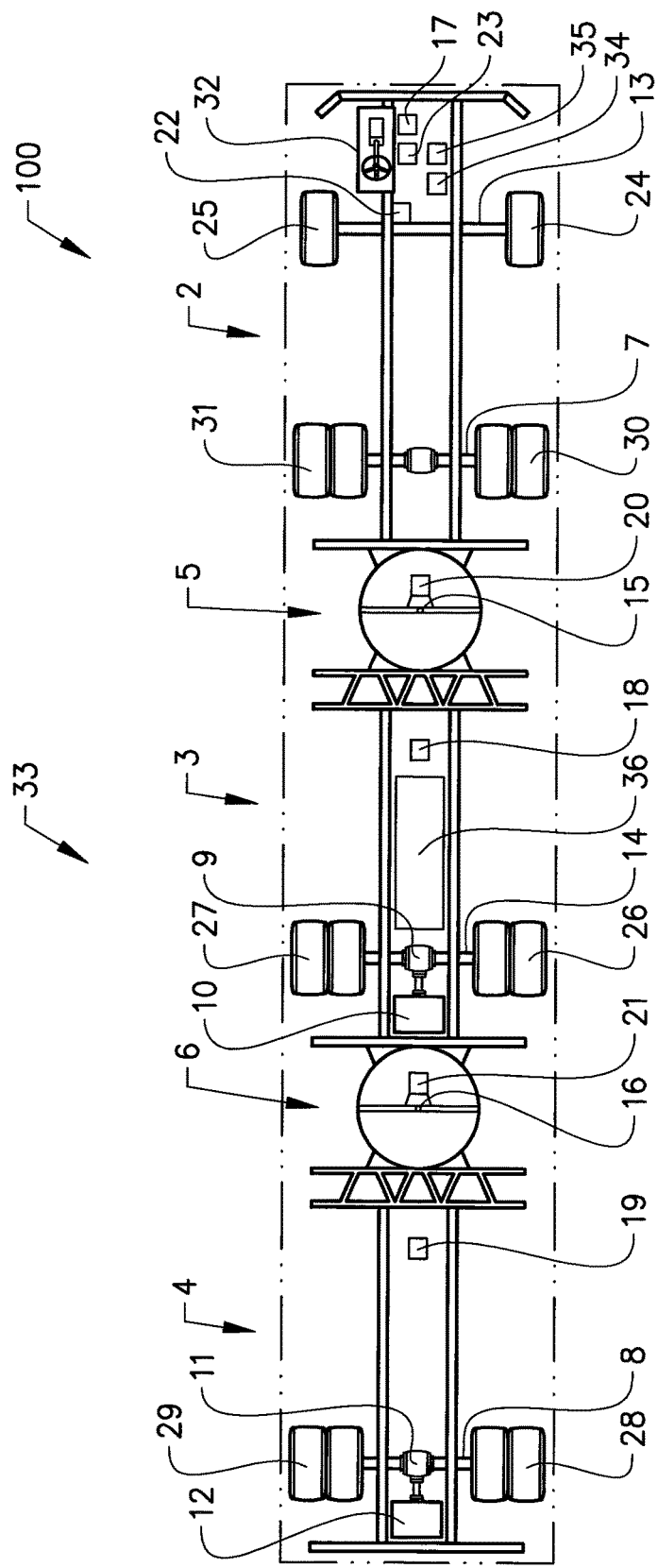
FIG. 2 shows another example of a schematic vehicle combination comprising three vehicle units according to the invention.

At the same time, it is of advantage to use the yaw rate as input for determining a desired articulation angle when the vehicle is travelling at high speed, since the articulation angle will be relatively small at high speeds and since the resolution of an angle sensor may not be high enough for measuring small articulation angles with a high precision. A low signal will also contain more noise and other disturbances which will degrade the measured signal. FIG. 2 shows another example of a schematic vehicle combination 100 comprising a first vehicle unit 2, a second vehicle unit 3 and a third vehicle unit 4. The difference between the vehicle combination 100 described here and the vehicle combination 1 described above, is that the first driven axle 7 is provided in the second vehicle unit 3. By mounting the hybrid drive system in the second vehicle unit 3 may be advantageous for e.g. weight distribution of the vehicle combination. In this example, only the second articulation angle will be controlled by the distributed propulsion system. The delay time determining means will determine the delay value between the steering wheels of the vehicle combination and the second articulated joint 6. Since the first driven axle is provided in the second vehicle unit, the first articulation joint will not be affected by controlling the propulsive ratio between the two driven axles. In this case, the second articulated joint will be controlled to follow the path of the front wheels.

Figure 3:
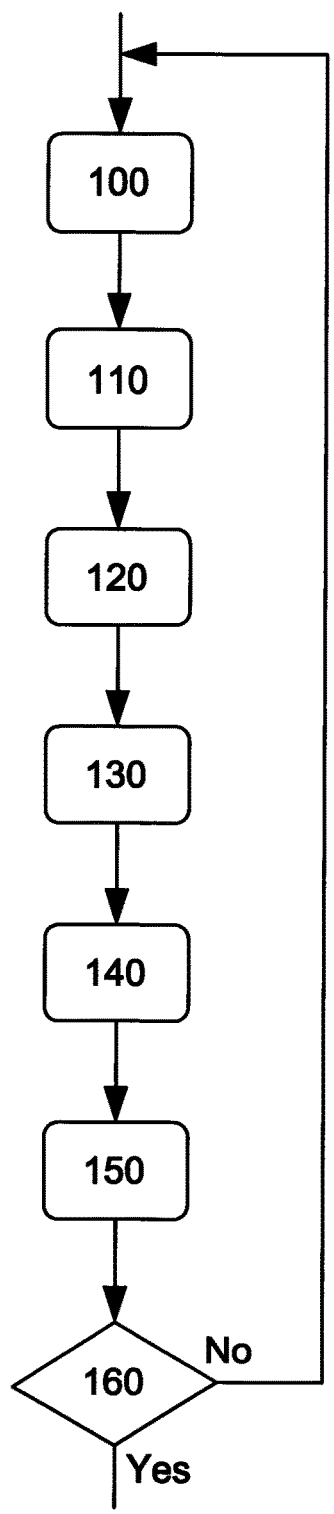
FIG. 3 shows a flow chart of an inventive method for improving the manoeuvrability of a vehicle combination.

FIG. 3 shows a schematic flow chart of a method for improving the manoeuvrability of a vehicle combination comprising a first vehicle unit, a second vehicle unit and a third vehicle unit, where the vehicle combination comprises a first driven axle and a second driven axle, where the vehicle units are interconnected by articulated joints.

In step 100, the articulation angles between the vehicle units are determined. The first articulation angle between the first vehicle unit and the second vehicle unit is determined by the first articulation angle determining means, and the second articulation angle between the second vehicle unit and the third vehicle unit is determined by the second articulation angle determining means. The articulation angle determining means may be e.g. an angle sensor mounted at the pivoting joint.

In step 110, the steering wheel angle of the vehicle combination is determined by a steering angle determining means. This is preferably an angle sensor mounted at the steering column or at a steering knuckle of the steering arrangement of the vehicle combination. The steering angle of the vehicle is preferably collected from the internal data bus of the vehicle combination.

In step 120, the vehicle speed of the vehicle combination is determined. The speed of the vehicle combination is measured by e.g. using a speed sensor and is preferably collected from the internal data bus of the vehicle combination.

In step 130, the yaw rate of each vehicle unit is determined if a yaw rate value is needed for the determination of a desired articulation angle. At low speeds or when the vehicle combination stands still, a yaw rate value is not used. The determination of the yaw rate for a vehicle unit is done by using the articulation angle for the articulated joint of that vehicle unit, the steering angle of the vehicle combination and the vehicle speed. A vehicle combination model can be used to determine the yaw rate or to determine the required articulation angles that are needed to be able to follow the curved path set by the steering wheel angle of the first vehicle unit.

In step 140, a delay value between the steering wheels of the vehicle combination and at least one of the articulated joints is determined. The delay value is obtained by using the speed of the vehicle combination and known length measurements of the vehicle combination.

Preferably, a first delay value between the steering wheels of the vehicle combination and the first articulated joint is determined, and a second delay value between the steering wheels of the vehicle combination and the second articulated joint is determined.

In step 150, a desired articulation angle of the first and the second articulated joints are controlled by coordinating the force ratio between the first driven axle and the second driven axle. The determined yaw rate of the vehicle units and the determined delay value are used to determine the force ratio.

In step 160, it is determined if the vehicle combination has completed the travel along the curved path. If not, the steps 100 to 150 are repeated until it is decided that the vehicle combination has completed the travel along the curved path. This may be decided e.g. by comparing the steering wheel angle to a predetermined angle value. When the steering wheel angle is less than the predetermined angle value, it can be decided that the travel is completed. The predetermined angle value may be e.g. in the range of 5-10 degrees or more.

The invention is not to be regarded as being limited to the embodiments described above, a number of additional variants and modifications being possible within the scope of the subsequent patent claims.

REFERENCE SIGNS

1: Vehicle combination
2: First vehicle unit
3: Second vehicle unit
4: Third vehicle unit
5: First articulated joint
6: Second articulated joint
7: First driven axle
8: Second driven axle
9: First differential
10: First propulsive source
11: Second differential
12: Second propulsive source
13: Front axle
14: Non-driven axle
15: First pivoting point
16: Second pivoting point
17: First yaw rate determining means
18: Second yaw rate determining means
19: Third yaw rate determining means
20: First articulation angle determining means
21: Second articulation angle determining means
22: Steering angle determining means
23: Delay time determining means
24: Right front wheel
25: Left front wheel
26: Right wheel of first driven axle
27: Left wheel of first driven axle
28: Right wheel of second driven axle
29: Left wheel of second driven axle
30: Right wheel of non-driven axle
31: Left wheel of non-driven axle
32: Steering wheel
33: Distributed propulsion system
34: Control unit
35: Speed determining means
36: Battery
100: Vehicle combination

The invention claimed is:

1. Arrangement for improving manoeuvrability of a vehicle combination comprising a first vehicle unit, a second vehicle unit and a third vehicle unit interconnected by articulated joints, where the vehicle combination further comprises a distributed propulsion system, in which, the vehicle combination comprises a first driven axle and a second driven axle and in which the first and the second driven axles can be controlled independently, means for determining the articulation angle between the vehicle units, means for determining a steering wheel angle of the vehicle combination, means for determining the speed of the vehicle combination, means for determining the yaw rate of the vehicle units, and means for determining a delay value between the steering wheels of the vehicle combination and at least one of the articulated joints, wherein the arrangement is adapted to control a desired articulation angle of the first and the second articulated joints by coordinating the force ratio between the first driven axle and the second driven axle by using the determined yaw rate or articulation angle of the vehicle units and the determined delay value.

2. Arrangement according to claim 1, wherein the yaw rate of each vehicle unit is determined by using the articulation angles, the steering angle and the vehicle speed.

3. Arrangement according to claim 1, wherein the desired first articulation angle and the desired second articulation angle are equal.

4. Arrangement according to claim 1, wherein the first driven axle is provided in the first vehicle unit and the second driven axle is provided in the third vehicle unit.

5. Arrangement according to claim 1, wherein the first driven axle is provided in the second vehicle unit and the second driven axle is provided in the third vehicle unit.

6. Arrangement according to claim 5, wherein a vehicle combination model is used to determine the required articulation angles that are needed to be able to follow the curved path set b the steering wheel angle of the first vehicle unit.

7. Arrangement according to claim 1, wherein the desired articulation angles are controlled such that the second vehicle unit and the third vehicle unit will follow a desired vehicle path, thereby reducing the radius of the swept path of the vehicle combination.

8. Arrangement according to claim 1, wherein the arrangement is adapted to control the force ratio between the first driven axle and the second driven axle such that the propulsive force of the second driven axle is larger than the propulsive force of the first driven axle when the actual vehicle speed is below a predetermined vehicle speed, thereby increasing the articulation angle of the first and the second articulated joints.

9. Arrangement according to claim 1, wherein the desire articulation angles are controlled such that the second vehicle unit and the third vehicle unit will increase the radius of the desired vehicle path.

10. Arrangement according to claim 9, wherein the arrangement is adapted to control the force ratio between the first driven axle and the second driven axle such that the propulsive force of the second driven axle, is lesser than the propulsive force of the first driven axle when the actual vehicle speed is above a predetermined vehicle speed, thereby decreasing the articulation angle of the first and the second articulated joints.

11. Arrangement according to claim 10, wherein the articulation angles are controlled such that the yaw rate of the second vehicle unit equals the yaw rate of the first vehicle unit after a first delay value and that yaw rate of the third vehicle unit equals the yaw rate of the first vehicle unit after a second delay value.

12. Vehicle comprising an arrangement according to claim 1.

13. Vehicle according to claim 12, wherein the vehicle combination consists of a tractor, a dolly and a semi-trailer.

14. Vehicle according to claim 12, wherein the vehicle combination consists of a bi-articulated bus.

15. A method for improving the manoeuvrability of a vehicle combination comprising a first vehicle unit, a second vehicle unit and a third vehicle unit, where the vehicle combination comprises a first driven axle and a second driven axle, where the vehicle units are interconnected by articulated joints, comprising the following steps:
determining the articulation angles between the vehicle units and/or determining the yaw rate of the vehicle units,
determining a steering wheel angle of the vehicle combination,
determining the speed of the vehicle combination, determining a delay value between the steering wheels of the vehicle combination and at least one of the articulated joints, controlling a desired articulation angle of the first and the second articulated joints by coordinating the force ratio between the first driven axle and the second driven axle by using the determined yaw rate of the vehicle units and the determined delay value.

16. Method according to claim 15, where the force ratio between the first driven axle and the second driven axle is controlled such that the propulsive force of the second driven axle is larger than the propulsive force of the first driven axle when the actual vehicle speed is below a predetermined vehicle speed, thereby increasing the articulation angle of the first and the second articulated joints.

17. Method according to claim 16, where the desired articulation angles are controlled such that the second vehicle unit and the third vehicle unit will follow a desired vehicle path set by the steering wheel angle of the first vehicle unit.

18. Method according to claim 15, where the force ratio between the first driven axle and the second driven axle is controlled such that the propulsive force of the second driven axle is lesser than die propulsive force of the first driven axle when the actual vehicle speed is above a predetermined vehicle speed, thereby decreasing the articulation angle of die first and the second articulated joints.

19. Method according to claim 18, where the articulation angles are controlled such that the yaw rate of the second vehicle unit equals the yaw rate of the first vehicle unit after a first delay value and that yaw rate of the third vehicle unit equals the yaw rate of the first vehicle unit after a second delay value.

20. A computer comprising a computer program for performing all the steps of claim 15 when the program is run on the computer.

21. A non-transitory computer program product comprising a computer program stored on a non-transitory computer readable medium for performing all the steps of claim 15 when the program product is run on a computer.

* * * * *